(12) United States Patent
Wen et al.

(10) Patent No.: US 10,901,766 B2
(45) Date of Patent: *Jan. 26, 2021

(54) METHOD AND APPARATUS FOR SIMULTANEOUSLY RUNNING MULTIPLE VIRTUAL MACHINES, AND ELECTRONIC DEVICE

(71) Applicant: CloudMinds (Shenzhen) Robotics Systems Co., Ltd., Shenzhen (CN)

(72) Inventors: Yanfei Wen, Shenzhen (CN); Yonghui Wang, Shenzhen (CN)

(73) Assignee: CLOUDMINDS (SHENZHEN) ROBOTICS SYSTEMS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 16/457,016

(22) Filed: Jun. 28, 2019

(65) Prior Publication Data

US 2019/0317785 A1 Oct. 17, 2019

Related U.S. Application Data

(63) Continuation of application No. PCT/CN2016/112833, filed on Dec. 29, 2016.

(51) Int. Cl.
*G06F 9/46* (2006.01)
*G06F 9/455* (2018.01)
*G06F 9/50* (2006.01)

(52) U.S. Cl.
CPC ........ *G06F 9/45545* (2013.01); *G06F 9/5077* (2013.01); *G06F 2009/45579* (2013.01)

(58) Field of Classification Search
CPC .............. G06F 9/45545; G06F 9/5077; G06F 2009/45579
See application file for complete search history.

(56) References Cited

U.S. PATENT DOCUMENTS

| | | | | |
|---|---|---|---|---|
| 6,496,847 B1 * | 12/2002 | Bugnion | ............ | G06F 9/45533 703/21 |
| 7,865,893 B1 * | 1/2011 | Omelyanchuk | ..... | G06F 11/3644 710/1 |

(Continued)

FOREIGN PATENT DOCUMENTS

| | | |
|---|---|---|
| CN | 1849585 A | 10/2006 |
| CN | 1936845 A | 3/2007 |

(Continued)

OTHER PUBLICATIONS

PCT International Search Report and Written Opinion dated Oct. 11, 2017 in corresponding Application No. PCT/CN2016/112833, 12 pages.

*Primary Examiner* — Wissam Rashid
(74) *Attorney, Agent, or Firm* — Dilworth IP, LLC (57) ABSTRACT

The present invention provides a method and apparatus for simultaneously running multiple virtual machines, and an electronic device. The method includes: initiating a request of running a second operating system in QEMU; triggering an exception to a Hypervisor of a currently running first operating system in a KVM module; storing a context of the Hypervisor of the first operating system in the Hypervisor of the first operating system, and loading the context of the Hypervisor of the second operating system; and storing the context of the first operating system in the Hypervisor of the second operating system, and loading the context of the second operating system. By adoption of the solution provided by the present application, multiple virtual machines can be run simultaneously, and the respective functions can be run independently.

10 Claims, 6 Drawing Sheets

(56) References Cited

U.S. PATENT DOCUMENTS

| | | | |
|---|---|---|---|
| 9,380,456 B1* | 6/2016 | Lee | H04W 12/08 |
| 10,437,622 B1* | 10/2019 | Chalmer | G06F 9/5077 |
| 2011/0131573 A1 | 6/2011 | Antony | |
| 2011/0271088 A1 | 11/2011 | Princen et al. | |
| 2015/0331763 A1* | 11/2015 | Cao | G06F 11/1484 |
| | | | 714/3 |
| 2015/0370588 A1 | 12/2015 | Ashok et al. | |
| 2015/0370592 A1* | 12/2015 | Tuch | G06F 9/45558 |
| | | | 718/1 |
| 2016/0147556 A1* | 5/2016 | Hu | G06F 9/45558 |
| | | | 718/1 |
| 2017/0003992 A1* | 1/2017 | Farkas | G06F 9/45558 |

FOREIGN PATENT DOCUMENTS

| | | |
|---|---|---|
| CN | 101051282 A | 10/2007 |
| CN | 102439567 A | 5/2012 |
| CN | 104598294 A | 5/2015 |
| CN | 105068859 A | 11/2015 |
| CN | 105993001 A | 10/2016 |

* cited by examiner

METHOD AND APPARATUS FOR SIMULTANEOUSLY RUNNING MULTIPLE VIRTUAL MACHINES, AND ELECTRONIC DEVICE

CROSS-REFERENCE TO RELATED APPLICATION

The present application is a continuation application under 35 U.S.C. § 120 of PCT application No. PCT/CN2016/112833 filed on Dec. 29, 2016, the contents of which are incorporated herein by reference.

FIELD OF THE INVENTION

The present invention relates to the field of virtualization technology, and in particular, it is related to a method and apparatus for simultaneously running multiple virtual machines, and an electronic device.

BACKGROUND OF THE INVENTION

Figure 1:
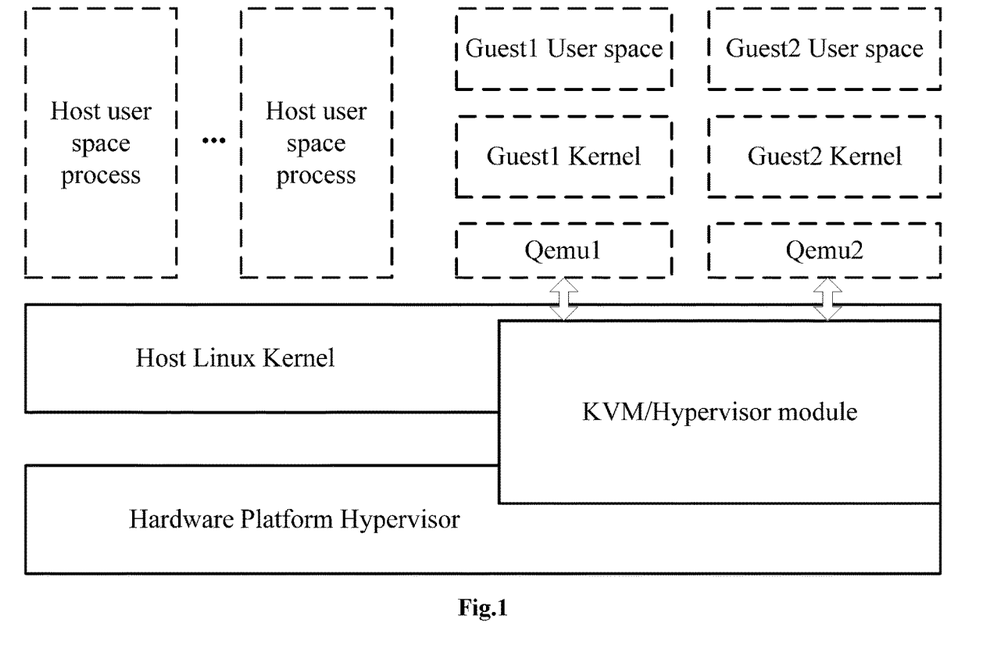
FIG. 1 shows a schematic diagram of a virtualization architecture based on the KVM technology in the prior art.

The KVM (Kernel Virtual Machine) technology is an open source virtualization solution, FIG. 1 shows an architecture schematic diagram of a virtualization solution based on the KVM technology in the prior art, as shown in the figure, it is generally composed of a host (Host) operating system and several virtual guest (Guest) operating systems, and these operating systems are operated on the same set of hardware processor chips and shared processors and peripheral resources.

An ARM processor supporting the virtualization architecture at least includes three modes: EL (Exception Level) 2, EL1 and EL0. The Hypervisor program is run in the EL2 mode, the Linux kernel program is run in the EL1 mode, and the user space program (Application of User mode) is run in the EL0 mode. The Hypervisor layer manages overall hardware resources such as CPU, memory, timers, and interrupts, and is responsible for loading and running operating system on the physical processors time-divisionally, there is an independent set processor resource from each operating system point of view, and operating systems are scheduled by turns. It looks like that one set of processor is able to run several operating system at the same time, this is so calling system virtualization technique.

Generally the virtualization platform only support its-self hypervisor software architecture, and it is difficult to merge 3$^{rd}$ part hypervisor code together.

SUMMARY OF THE INVENTION

One object of the embodiment of the present application is to solve the technical problem in the prior art that a virtualization solution can only execute one Platform Hypervisor on a Hypervisor layer and cannot execute third-party Hypervisor software.

In a first aspect, the embodiment of the present application provides a method for simultaneously running multiple virtual machines, including:

initiating a request of running a second operating system in QEMU;

triggering an exception to a Hypervisor of a currently running first operating system in a KVM module;

storing a context of the Hypervisor of the first operating system in the Hypervisor of the first operating system, and loading the context of the Hypervisor of the second operating system; and storing the context of the first operating system in the Hypervisor of the second operating system, and loading the context of the second operating system.

In a second aspect, the embodiment of the present application provides an apparatus for simultaneously running multiple virtual machines, including:

a receiving module, configured to initiate a request of running a second operating system in QEMU;

a virtual machine switching module, configured to trigger an exception to a Hypervisor of a currently running first operating system in a KVM module;

a first switching interface module, configured to store a context of the Hypervisor of the first operating system in the Hypervisor of the first operating system, and load the context of the Hypervisor of the second operating system; and a second switching interface module, configured to store the context of the first operating system in the Hypervisor of the second operating system, and load the context of the second operating system.

In a third aspect, the embodiment of the present application provides an electronic device, including: a memory, one or more processors, and one or more modules, the one or more modules are stored in the memory and are configured to be executed by the one or more processors, and the one or more modules include instructions for executing each step in the method described above.

In a fourth aspect, the embodiment of the present application provides a computer program product combined with an electronic device for use, the computer program product includes a computer program embedded in a computer readable storage medium, and the computer program includes an instruction for causing the electronic device to execute each step in the method described above.

The beneficial effects are as follows:

In the embodiment of the present application, after the request of running the second operating system is initiated in the QEMU, the exception can be triggered to the Hypervisor of the currently running first operating system in the KVM module, the context of the Hypervisor of the first operating system is stored in the Hypervisor of the first operating system, the context of the Hypervisor of the second operating system is loaded, the context of the first operating system is stored in the Hypervisor of the second operating system, and the context of the second operating system is loaded, therefore the context management of the Hypervisor and the virtual operating system thereof is achieved, thus implementing the dynamic switching running of the virtual machines, and even if the hardware supports only one virtualization extension, the multiple virtual machines can be run simultaneously, and the respective functions can be run independently.

BRIEF DESCRIPTION OF THE DRAWINGS

Specific embodiments of the present application will be described below with reference to the drawings, in which.

DETAILED DESCRIPTION OF THE EMBODIMENTS

In order that the technical solutions and advantages of the present application are clearer, a further detailed description of the exemplary embodiments of the present application will be given below in combination with the drawings. Apparently, the embodiments described below are merely a part, but not all, of the embodiments of the present application. Furthermore, the embodiments in the description and the features in the embodiments can be combined with each other without conflicts.

The inventor noticed during the invention process that:

In the prior art, a KVM/Hypervisor module spans two layers of Host Linux kernel and Hypervisor, thereby providing an interface node for QEMU and allowing the QEMU to create a virtual CPU through a KVM node to manage virtualization resources on one hand; and on the other hand, the KVM/Hypervisor switches a Host Linux system out from a physical CPU, then loads a Guest Linux system onto a physical processor for running, and finally processes subsequent transactions of abnormal exit of the Guest Linux system.

QEMU, running as an application of Host Linux, provides virtual hardware device resources for the running of the Guest Linux, creates the virtual CPU through the device KVM node of the KVM/Hypervisor module, allocates physical hardware resources, and loads an unmodified Guest Linux to a physical hardware processor for running. As those one skilled in the art would understand, QEMU is a generic and open source machine emulator and virtualizer.

Through the above description, in order to achieve virtualization on a hardware platform, a very critical function to be implemented on a Hypervisor layer is to perform onsite protection on a running context of the operating system currently running on the physical hardware and then restore the running context of another operating system onto the physical hardware and to start to execute the code, thereby achieving the dynamic switching running of the operating systems. If one hardware platform has implemented more complex logic functions on the Hypervisor layer and does not support a virtualization function, it would be very difficult to run the virtualization software on such a platform.

The existing mobile platform software has run very complicated logic, the existing software has occupied the physical hardware resources of all Hypervisor layers, such as a stage 2 MMU page table and an exception vector table, and in this case, the third-party Hypervisor software does not have any permission or opportunity to be executed on the Hypervisor layer.

In view of the deficiencies of the prior art, the embodiment of the present application proposes a method and apparatus for simultaneously running multiple virtual machines, and an electronic device, which enable the multiple virtual machines to run simultaneously and ensure the independent running of respective functions in the case that the hardware supports only one virtualization extension.

The details will be described below.

First Embodiment

Figure 2:
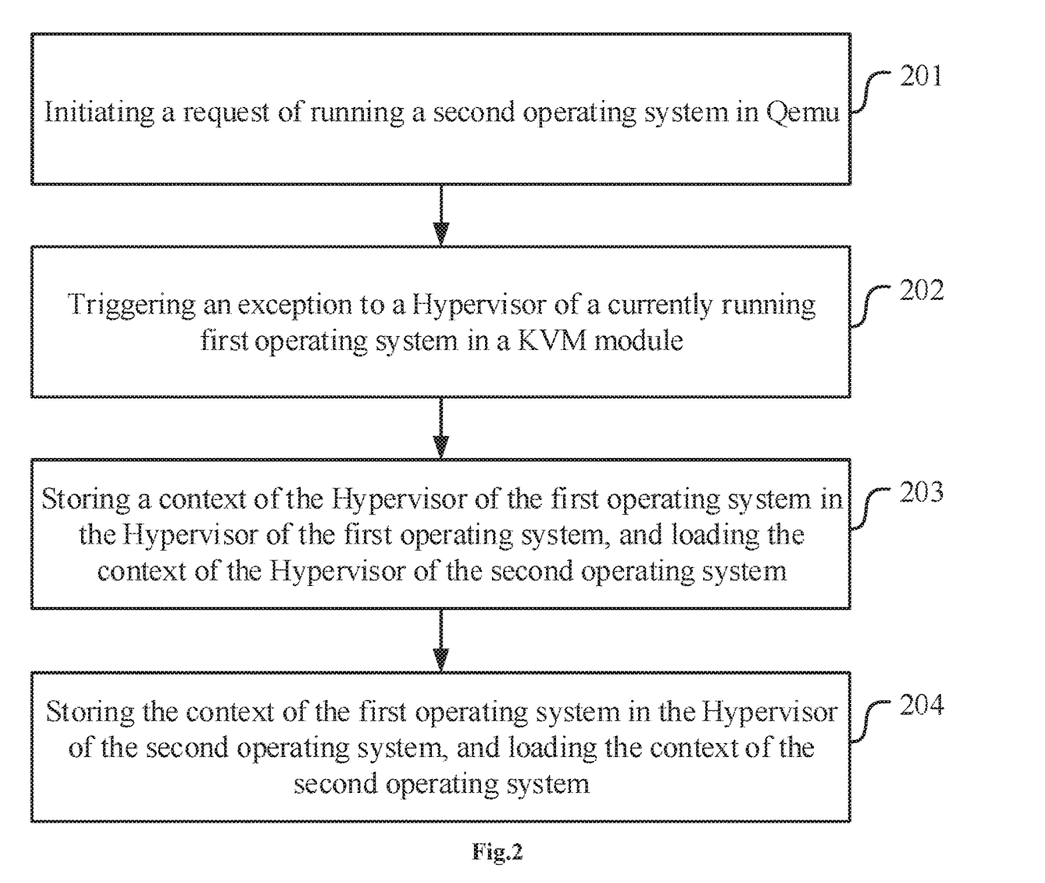
FIG. 2 shows a schematic flow diagram for implementing a method for simultaneously running multiple virtual machines in a first embodiment of the present application.

FIG. 2 shows a schematic flow diagram for implementing a method for simultaneously running multiple virtual machines in a first embodiment of the present application, and as shown in the figure, the method for simultaneously running the multiple virtual machines can include the following steps:

Step 201, initiating a request of running a second operating system in QEMU;

step 202, triggering an exception to a Hypervisor of a currently running first operating system in a KVM module;

step 203, storing a context of the Hypervisor of the first operating system in the Hypervisor of the first operating system, and loading the context of the Hypervisor of the second operating system; and step 204, storing the context of the first operating system in the Hypervisor of the second operating system, and loading the context of the second operating system.

During the specific implementation, the QEMU can be used as a progress of the first operating system, after the QEMU is started, the request of running the second operating system can be initiated, in the embodiment of the present application, a function module Hypervisor Swap controller (referred to as Swap controller) for switching can be added to the KVM module, the Hypervisor Swap controller is responsible for triggering the exception to the Hypervisor of the currently running first operating system, each Hypervisor can have a function module Hypervisor Swap entry (referred to as Swap entry) for context processing, the dynamic switching running of Hypervisor software is implemented by the Swap entry, when one operating system needs to be loaded into a CPU for running, the Swap controller executes a code of the Swap entry in the Hypervisor of the operating system through exception calling, then stores the context of the Hypervisor of the current operating system, and then writes the context of the Hypervisor to be run into a register of a physical hardware CPU and starts running the Hypervisor, and the Swap entry of the Hypervisor to be run stores the context of the previous running operating system and loads the context of the operating system to be run.

Compared with the existing virtualization architecture solution, the embodiment of the present application increases the functions of the Hypervisor Swap Controller and the Hypervisor Swap Entry while maintaining the Hypervisor software framework of the original hardware platform unchanged, and implements the simultaneous running of the multiple virtual machines and the dynamic switching running of software on the Hypervisor layer on the basis of single hardware virtualization expansion, thereby supporting the implementation of different upper layer virtual operating systems, that is, independent functions.

The embodiment of the present application can be applied to a case in which the hardware platform is a multi-core processor, and for the multi-core processor, each Core can independently run a virtual machine of a different function type.

In an implementation, the method can further include:
when the termination of the running of the second operating system is monitored in the QEMU, storing the context of the second operating system in the Hypervisor of the second operating system, and loading the context of the first operating system;
triggering an exception to the Hypervisor of the second operating system in the KVM module; and
storing the context of the Hypervisor of the second operating system in the Hypervisor of the second operating system, and loading the context of the Hypervisor of the first operating system.

During specific implementation, after the termination of the running of the second operating system, it returns to the QEMU. In the embodiment of the present invention, after the termination of the running of the second operating system is monitored in the QEMU, the context of the second operating system may be stored in the Hypervisor of the second operating system, and the context of the first operating system may be loaded, then the exception is triggered to the Hypervisor of the second operating system in the KVM module, the context of the Hypervisor of the second operating system is stored in the Hypervisor of the second operating system, and the context of the Hypervisor of the first operating system is loaded to restore the normal running of the Hypervisor of the first operating system and the first operating system.

In an implementation, the storing a context of the Hypervisor of the first operating system in the Hypervisor of the first operating system, and loading the context of the Hypervisor of the second operating system can be specifically as follows:
calling back the KVM module in the Hypervisor of the first operating system, storing the context of the Hypervisor of the first operating system in the KVM module, and loading the context of the Hypervisor of the second operating system.

During specific implementation, after the request of running the second operating system is initiated in the QEMU, the Hypervisor of the first operating system is triggered in the KVM module through the exception calling, the Hypervisor of the first operating system calls back the KVM module, the context of the Hypervisor of the first operating system is stored in the KVM module, and the context of the Hypervisor of the second operating system is loaded into the progress of a physical hardware processor, and a software code of the Hypervisor of the second operating system is started to be run; and the Hypervisor of the second operating system stores the context of the first operating system and loads the context of the second operating system onto the physical hardware, and the processor starts running the second operating system.

After the second operating system finishes running, it can return to the Hypervisor of the second operating system to store the context of the second operating system and restore the context of the first operating system at the same time.

The Hypervisor of the second operating system is triggered to call back the KVM module in the KVM module through the exception calling, the context of the Hypervisor of the second operating system is protected in the KVM module, meanwhile the context of the Hypervisor of the first operating system is restored onto the physical hardware processor, and at this time, the first operating system and its Hypervisor recovers the normal operation.

In an implementation, the first operating system can be a Host operating system, the Hypervisor of the first operating system can be a platform Hypervisor, the second operating system can be a Guest operating system, and the Hypervisor of the second operating system can be a third-party Hypervisor.

During the specific implementation, when the system is running, when the Host operating system and the platform Hypervisor are in a normal running state and after a running request from the Guest operating system is received, platform Hypervisor is dynamically switched to the third-party Hypervisor to realize the running purpose of the Guest operating system; or, when the system is running, when the Guest operating system and the third-party Hypervisor are in the normal running state and after the running request from the Host operating system is received, the third-party Hypervisor is dynamically switched to the platform Hypervisor to realize the running purpose of the Host operating system.

After the termination of the running of the Guest operating system, the embodiment of the present invention can automatically switch back to the Host operating system for running.

In an implementation, the kernel of the first operating system is a Host Linux kernel, and the kernel of the second operating system is a Guest Linux kernel.

During the specific implementation, the operating system can be a Linux system, the kernel of the first virtual operating system is the Host Linux kernel, the kernel of the second virtual operating system is the Guest Linux kernel, those skilled in the art can also adopt other operating system kernels, which is not limited in the present application.

During specific implementation, for the switching process of the Hypervisors, a space can be preset to store the respective contexts of the Hypervisors, in the embodiment of the present application, the contexts of two Hypervisors to be switched can be stored in the stack (stack) space of the Hypervisor to be loaded on the CPU and can also be stored in the storage space of the KVM module.

In an implementation, the third-party Hypervisor can be used for switching the Host operating system supported by an upper layer and at least one Guest virtual operating system.

During specific implementation, the platform Hypervisor can be a Qualcomm Platform Hypervisor or the like, and the third-party Hypervisor can be a Xen architecture Hypervisor, a KVM Hypervisor or the like.

Second Embodiment

Based on the same inventive concept, the embodiment of the present application further provides an apparatus for simultaneously running multiple virtual machines. Since the principle of these devices to solve the problem is similar to the method for simultaneously running multiple virtual machines, the implementation of these devices can refer to the implementation of the method, and repeated parts are not repeatedly described herein.

Figure 3:
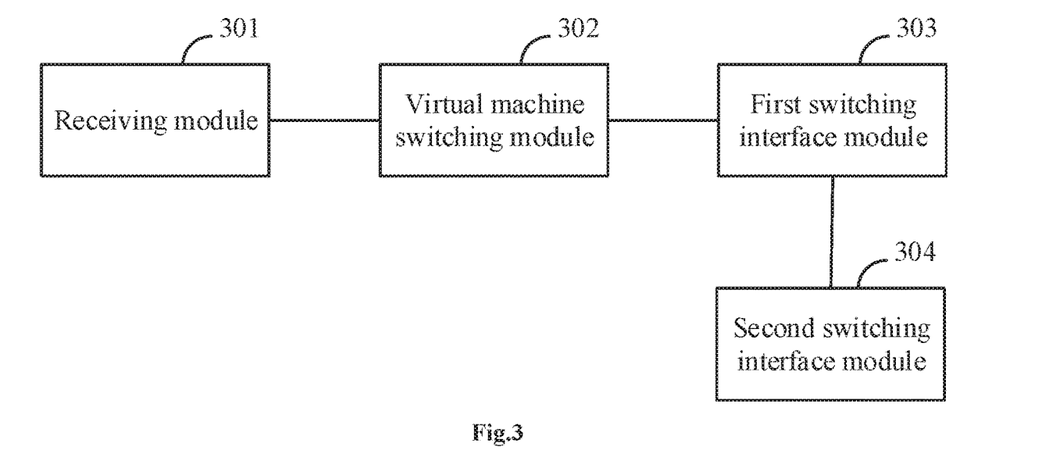
FIG. 3 shows a structural schematic diagram of an apparatus for simultaneously running multiple virtual machines in a second embodiment of the present application.

FIG. 3 shows a structural schematic diagram of an apparatus for simultaneously running multiple virtual machines in the second embodiment of the present application, and as shown in the figure, the apparatus for simultaneously running multiple virtual machines can include the following components:
a receiving module 301, configured to initiate a request of running a second operating system in QEMU;
a virtual machine switching module Hypervisor swap controller 302, configured to trigger an exception to a Hypervisor of a currently running first operating system in a KVM module;

a first switching interface module swap entry 303, configured to store a context of the Hypervisor of the first operating system in the Hypervisor of the first operating system, and load the context of the Hypervisor of the second operating system; and a second switching interface module swap entry 304, configured to store the context of the first operating system in the Hypervisor of the second operating system, and load the context of the second operating system.

In an implementation, the second switching interface module swap entry can be further configured to store the context of the second operating system in the Hypervisor of the second operating system and load the context of the first operating system, after the termination of the running of the second operating system is monitored in QEMU;

the virtual machine switching module Hypervisor swap controller can be further configured to trigger an exception to the Hypervisor of the second operating system in the KVM module; and the second switching interface module swap entry can be further configured to store the context of the Hypervisor of the operating system in the Hypervisor of the second operating system and load the context of the Hypervisor of the first operating system.

In an implementation, the first switching interface module swap entry can be specifically configured to call back the KVM module in the Hypervisor of the first operating system, store the context of the Hypervisor of the first operating system in the KVM module, and load the context of the Hypervisor of the second operating system.

In an implementation, the first operating system can be a Host operating system, the Hypervisor of the first operating system can be a platform Hypervisor, the second operating system can be a Guest operating system, and the Hypervisor of the second operating system can be a third-party Hypervisor.

In an implementation, the kernel of the first operating system may be a Host Linux kernel, and the kernel of the second operating system may be a Guest Linux kernel.

For the convenience of description, various parts of the above described apparatus are divided into various modules or units according to the functions to be described respectively. Of course, the functions of the modules or units can be implemented in the same one or more software or hardware during the implementation of the present application.

Third Embodiment

Based on the same inventive concept, the embodiment of the present application further provides an electronic device, which will be described below.

Figure 4:
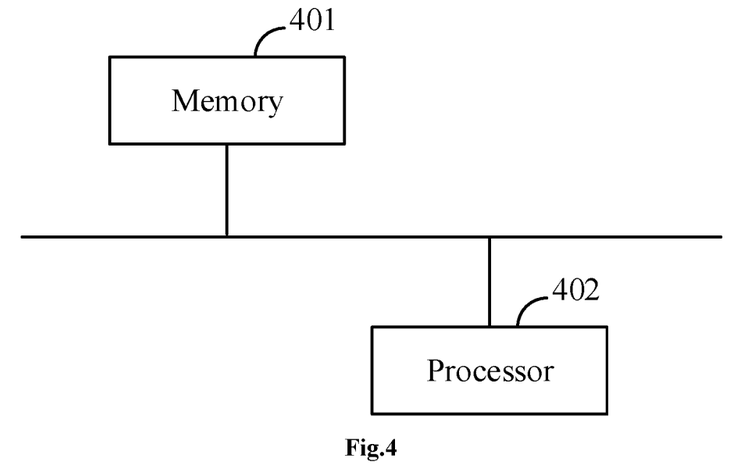
FIG. 4 shows a structural schematic diagram of an electronic device in a third embodiment of the present application.

FIG. 4 shows a structural schematic diagram of an electronic device in the third embodiment of the present application, and as shown in the figure, the electronic device can include: a memory 401, one or more processors 402, and one or more modules; and the one or more modules are stored in the memory 402 and are configured to be executed by the one or more processors 402, and the one or more modules include instructions for executing each step in the method for simultaneously running multiple virtual machines described above.

During specific implementation, the electronic device can be a mobile phone, a pad, a tablet computer, a personal computer PC, an intelligent robot or other product.

In an implementation, the electronic device can further include: a display screen, the display screen can be used for displaying a graphical user interface, and the display screen can specifically be a Touch screen or a non-touch screen.

In the electronic device provided by the embodiment of the present application, even if the hardware supports only one virtualization extension, multiple virtual machines can be run simultaneously, and the respective functions can be run independently.

Fourth Embodiment

Based on the same inventive concept, the embodiment of the present application further provides a computer program product combined with an electronic device for use, which will be described below.

The computer program product combined with the electronic device for use provided by the embodiment of the present application includes: a computer program embedded in a computer readable storage medium, and the computer program includes an instruction for causing the electronic device to execute each step in the method for simultaneously running multiple virtual machines described above.

In order to facilitate the implementation of the present application, the following description will be made by way of example.

Fifth Embodiment

The embodiment of the present application is described by taking the virtualization architecture of the Linux Kernel as an example, including a Platform Hypervisor and a KVM Hypervisor.

Figure 5:
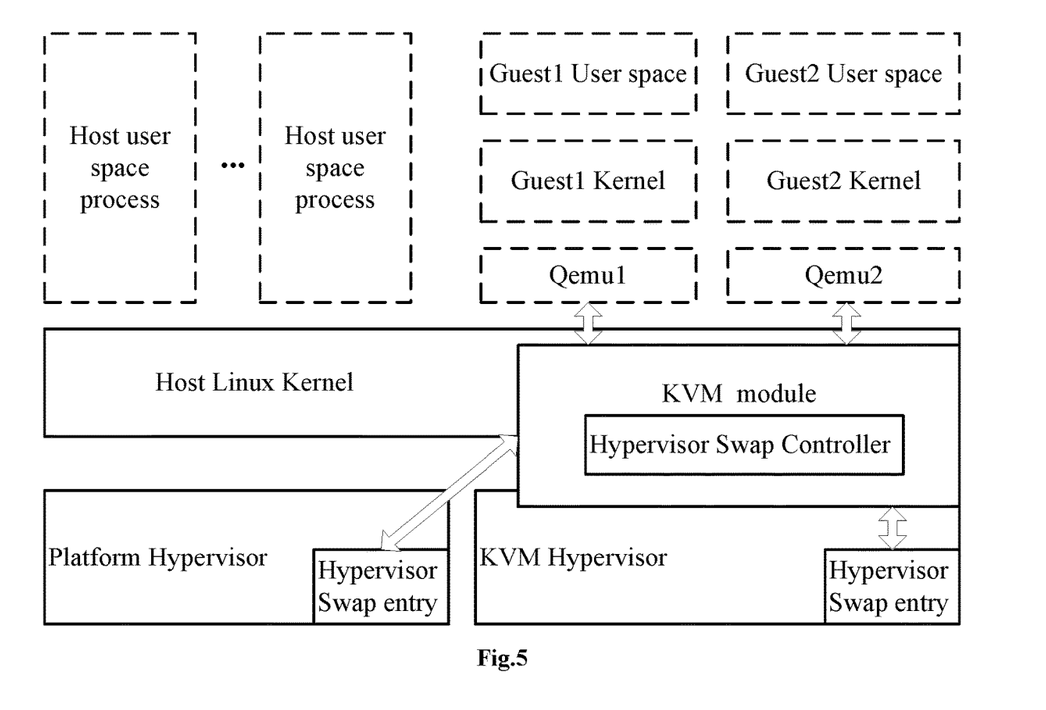
FIG. 5 shows a schematic diagram of a virtualization architecture in a fifth embodiment of the present application.

FIG. 5 shows a schematic diagram of a virtualization architecture in the fifth embodiment of the present application, as shown in the figure, compared with the virtualization architecture solution in the prior art, the embodiment of the present application has the advantages of integrating a part of software codes of a Linux open source Hypervisor on the basis of maintaining the Hypervisor software framework of the original hardware platform unchanged, and respectively adding the functions of Hypervisor Swap Controller and Hypervisor Switcher Entry on the architecture diagram to realize the dynamic switching running of software on the Hypervisor layer.

The Swap Controller is responsible for the dynamic switching running of the Hypervisors of different functions, for example, a Qualcomm Platform Hypervisor, a Xen architecture Hypervisor, a KVM Hypervisor, and so on. Then the Hypervisor itself implements the switching of the operating system supported by the upper layer, for example, the KVM Hypervisor is responsible for the switching running of Host Linux and multiple Guest Linux virtual operating systems. By adoption of the technical solution provided by the embodiment of the present application, multiple virtual machines can be simultaneously run on the basis of single hardware virtualization extension to support the implementation of different upper layer virtual operating systems and independent functions.

Figure 6:
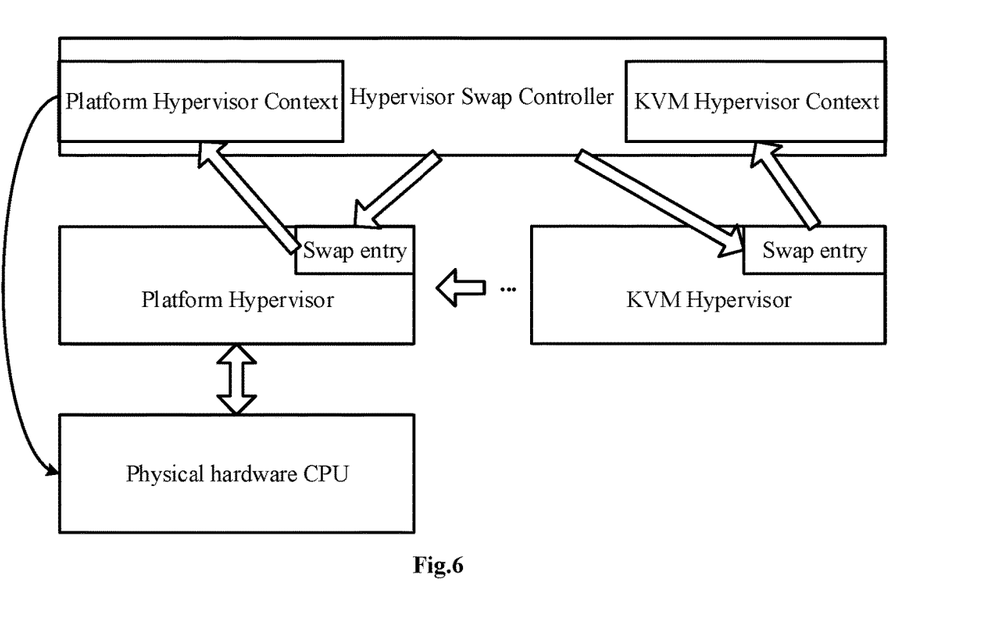
FIG. 6 shows a schematic block diagram of simultaneously running multiple virtual machines in the fifth embodiment of the present application.

FIG. 6 shows a schematic block diagram of simultaneously running multiple virtual machines in the fifth embodiment of the present application, as shown in the figure, the Hypervisor Swap Controller is responsible for triggering the switching of the Hypervisors, and each Hypervisor has a Swap entry. The Swap Controller implements the dynamic switching running of the virtual machines (virtual operating systems) on the Hypervisors through the Swap entry, when one virtual operating system needs to be loaded into the CPU for running, the Swap Controller executes the code of the Swap entry in the Hypervisor corresponding to the virtual operating system by exception calling, stores the context of the current Hypervisor, then writes the context of the Hypervisor to be run in the register of the physical hardware CPU, and starts the running, and the Hypervisor to be run stores the context of the first virtual operating system, loads the context of the second virtual operating system, and achieves the running of the second virtual operating system.

Figure 7:
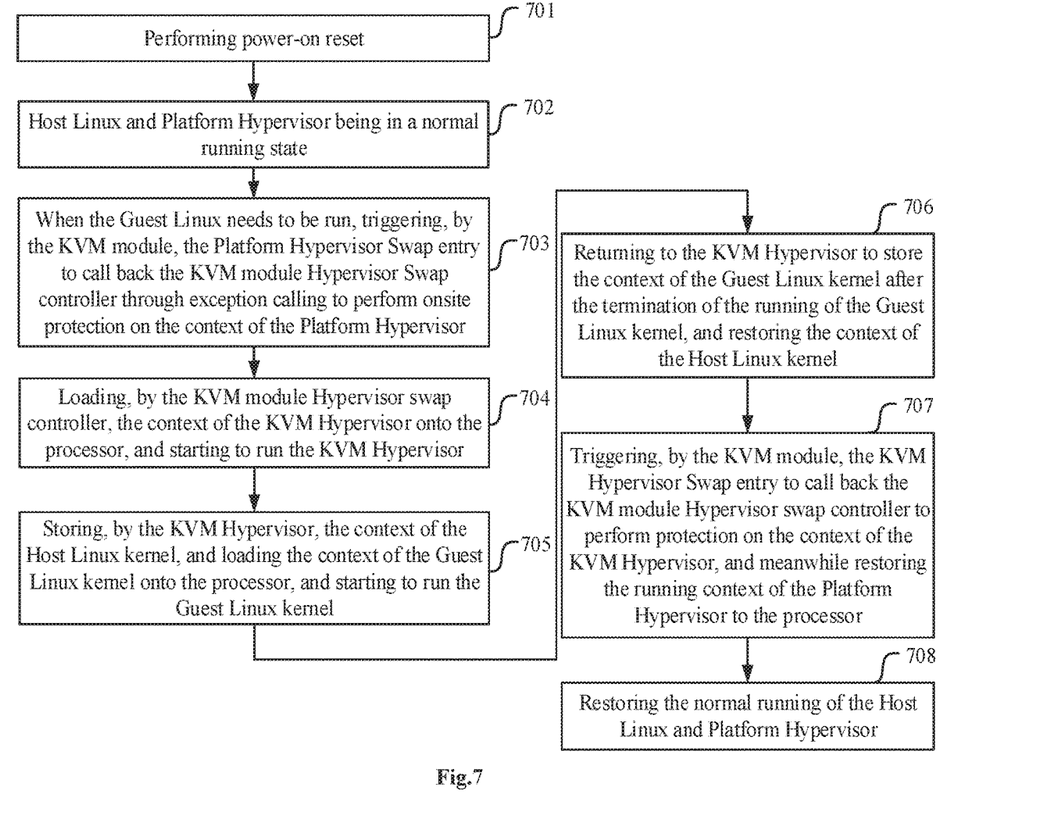
FIG. 7 shows a schematic flow diagram of simultaneously running multiple virtual machines in the fifth embodiment of the present application.

FIG. 7 shows a schematic flow diagram of simultaneously running multiple virtual machines in the fifth embodiment of the present application, and as shown in the figure, the specific processes can be as follows:

Step 701, performing power-on reset;

step 702, Host Linux and Platform Hypervisor being in a normal running state;

step 703, when the Guest Linux needs to be run, triggering, by the KVM module, the Platform Hypervisor Swap entry to call back the KVM module Hypervisor Swap controller through exception calling to perform onsite protect on the running context of the Platform Hypervisor;

step 704, loading, by the KVM module Hypervisor swap controller, the context of the KVM Hypervisor onto the physical hardware processor, and starting to run the software code of the KVM Hypervisor;

step 705, storing, by the KVM Hypervisor, the context of the Host Linux kernel, and loading the context of the Guest Linux kernel onto the physical hardware, and starting, by the processor, to run the Guest Linux kernel;

step 706, returning to the KVM Hypervisor to store the context of the Guest Linux kernel after the termination of the running of the Guest Linux kernel, and meanwhile restoring the context of the Host Linux kernel;

step 707, triggering, by the KVM module, the KVM Hypervisor Swap entry to call back the KVM module Hypervisor swap controller to perform onsite protection on the running context of the KVM Hypervisor by exception calling, and meanwhile restoring the running context of the Platform Hypervisor to the physical hardware processor; and step 708, restoring the normal running of the Host Linux and Platform Hypervisor.

Sixth Embodiment

The embodiment of the present application is described by taking a multi-core processor as an example.

Figure 8:
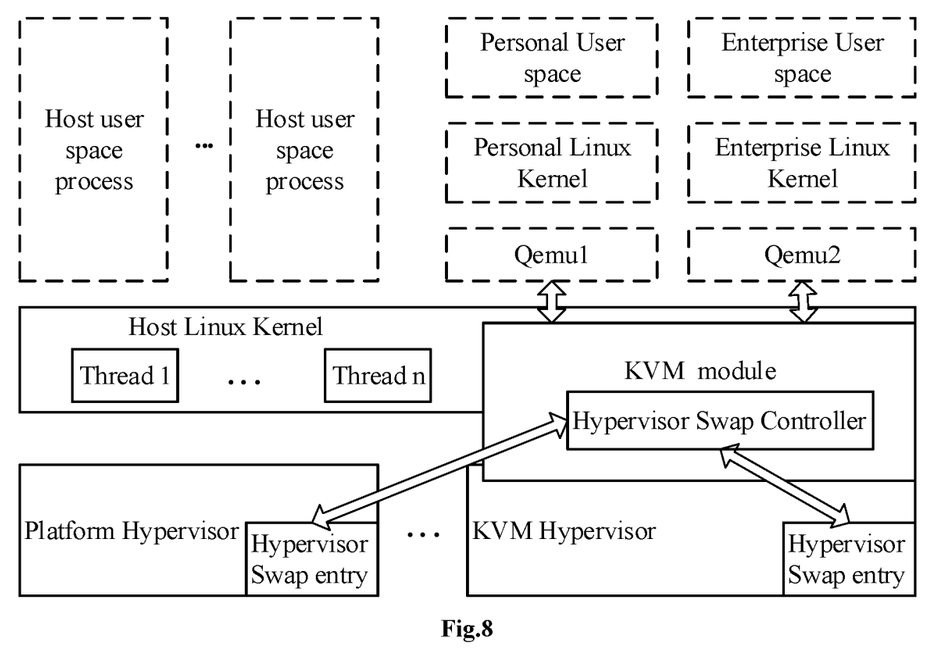
FIG. 8 shows a schematic diagram of a virtualization architecture of a multicore processor in a sixth embodiment of the present application.

FIG. 8 shows a schematic diagram of a virtualization architecture of a multicore processor in a sixth embodiment of the present application, as shown in the figure, the multi-core processor can be a Linux Kernel including multiple threads, and each core independently runs one virtual operating system during implementation, for example, one kernel serves as a Host Linux Kernel to independently run a Host operating system, one kernel serves as a Guest1 Linux Kernel to independently run a Guest1 operating system (for example, a personal operating system), and another kernel serves as a Guest2 Linux Kernel to independently run a Guest2 operating system (for example, an enterprise operating system), wherein the Guest1 operating system (the personal operating system) can be provided and allocated with resources by QEMU 1, and the Guest2 operating system (the enterprise operating system) can be provided and allocated with resources by QEMU 2.

The Hypervisor layer can include several different Hypervisors, such as a Platform Hypervisor, a Xen architecture Hypervisor, a KVM Hypervisor, a Linux Containers (LXC), and so on.

When these virtual operating systems need to be switched, the Hypervisors corresponding to the virtual operating systems are correspondingly switched, for example, switching from the Platform Hypervisor to the Xen architecture Hypervisor, switching from the Xen architecture Hypervisor to the KVM Hypervisor and the like, and the Hypervisor Swap Controller is responsible for triggering the exception to the currently running Hypervisor and running the Swap entry module of the currently running Hypervisor.

The Swap entry module of the currently running Hypervisor stores the context of the currently running Hypervisor in the specified location and loads the context of the target Hypervisor stored in the specified location into the register of the CPU, and then the target Hypervisor stores the context of the previous running virtual operating system and loads the context of the virtual operating system corresponding to the target Hypervisor stored in the specified location into the register of the CPU.

The specified location can be a space of a Hypervisor such as the Platform Hypervisor, the Xen architecture Hypervisor, the KVM Hypervisor, the Linux Containers (LXC) or the like and can also be a space in the KVM module, and during the actual implementation, the context of the virtual operating system to be switched can be stored in the QEMU of the Host Linux Kernel.

During specific implementation, the Host Linux Kernel can have multiple QEMUs, and each QEMU is responsible for providing the hardware device resources of the virtual operating system for the running of one virtual operating system.

The specific data structure can be a stack and can also be other data structure forms (for example, an array, a queue and the like) as long as a data access function is available.

During the specific implementation, multiple data structures can be provided, for example: two stacks, one stack is used for storing the context of the Platform Hypervisor, the other stack is used for storing the context of the KVM Hypervisor and the like, and the recording state of the context can be at the bottom of any stack.

Those skilled in the art should be aware that the embodiment of the present application can be provided as a method, a system or a computer program product. Thus, the present application can take the form of an entirely hardware embodiment, an entirely software embodiment, or an embodiment combining software with hardware. Moreover, the present application can take the form of a computer program product implemented on one or more computer usable storage media (including, but not limited to, a disk memory, a CD-ROM, an optical memory and the like) including computer usable program codes.

The present application is described with reference to the flowcharts and/or block diagrams of the method, device (system) and the computer program product according to the embodiments of the present application. It should be understood that each flow and/or block in the flowcharts and/or block diagrams, and combinations of the flows and/or blocks in the flowcharts and/or block diagrams can be implemented by computer program instructions. These computer program instructions can be provided to a processor of a general purpose computer, a special purpose computer, an embedded processor or other programmable data processing devices to generate a machine, so that instructions executed by the processors of the computers or other programmable data processing devices generate an apparatus for implementing specified functions in one or more flows in the flowcharts and/or one or more blocks in the block diagrams.

These computer program instructions can also be stored in a computer readable memory capable of guiding the computers or the other programmable data processing devices to work in particular manners, such that the instructions stored in the computer readable memory generate products including instruction apparatuses, and the instruction apparatuses achieve the specified functions in one or more flows of the flowcharts and/or one or more blocks of the block diagrams.

These computer program instructions can also be loaded on the computers or the other programmable data processing devices, to execute a series of operation steps on the computers or the other programmable data processing devices to produce processing achieved by the computers, such that the instructions executed on the computers or the other programmable data processing devices provide steps used for achieving the steps of the specified functions in one or more flows of the flowcharts and/or one or more blocks of the block diagrams.

Although the preferred embodiments of the present application have been described, those skilled in the art can make additional changes and modifications to these embodiments once knowing the basic creative concepts. Therefore, the appended claims are intended to be interpreted as including the preferred embodiments and all changes and modifications falling within the scope of the present application.

The invention claimed is:

1. A method for simultaneously running multiple virtual machines, comprising:
    initiating a request of running a second operating system in QEMU;
    triggering an exception to a Hypervisor of a first operating system in a Kernel Virtual Machine (KVM) module, wherein the first operating system is a currently running operating system;
    storing a context of the Hypervisor of the first operating system in a storage space of the Hypervisor of the first operating system, and loading a context of a Hypervisor of the second operating system; and
    storing the context of the first operating system in a storage space of the Hypervisor of the second operating system, and loading the context of the second operating system, so that the currently running operating system is switched to the second operating system.

2. The method according to claim 1, further comprising:
    when a termination of the running of the second operating system is monitored in the QEMU, storing the context of the second operating system in the Hypervisor of the second operating system, and loading the context of the first operating system;
    triggering an exception to the Hypervisor of the second operating system in the KVM module; and
    storing the context of the Hypervisor of the second operating system in the storage space of the Hypervisor of the second operating system, and loading the context of the Hypervisor of the first operating system, so that the currently running operating system is switched to the first operating system.

3. The method according to claim 1, wherein the storing a context of the Hypervisor of the first operating system in a storage space of the Hypervisor of the first operating system, and loading a context of a Hypervisor of the second operating system is specifically as follows: calling back the KVM module in the Hypervisor of the first operating system, storing the context of the Hypervisor of the first operating system in the KVM module, and loading the context of the Hypervisor of the second operating system.

4. The method according to claim 1, wherein the first operating system is a Host operating system, the Hypervisor of the first operating system is a platform Hypervisor, the second operating system is a Guest operating system, and the Hypervisor of the second operating system is a third-party Hypervisor, wherein the third-party Hypervisor is a Hypervisor other than the platform Hypervisor.

5. The method according to claim 1, wherein a kernel of the first operating system is a Host Linux kernel, and the kernel of the second operating system is a Guest Linux kernel.

6. An electronic device, comprising: a memory, one or more processors, and one or more modules;
    the one or more modules are stored in the memory and are configured to be executed by the one or more processors, and the one or more modules comprise instructions for executing the following steps:
    initiating a request of running a second operating system in QEMU;
    triggering an exception to a Hypervisor of a first operating system in a Kernel Virtual Machine (KVM) module, wherein the first operating system is currently running operating system;
    storing a context of the Hypervisor of the first operating system in a storage space of the Hypervisor of the first operating system, and loading a context of a Hypervisor of the second operating system; and
    storing the context of the first operating system in a storage space of the Hypervisor of the second operating system, and loading the context of the second operating system; so that the currently running operating system is switched to the second operating system.

7. The electronic device according to claim 6, the one or more modules further comprise instructions for executing steps of:
    when a termination of the running of the second operating system is monitored in the QEMU, storing the context of the second operating system in the Hypervisor of the second operating system, and loading the context of the first operating system;
    triggering an exception to the Hypervisor of the second operating system in the KVM module; and
    storing the context of the Hypervisor of the second operating system in the storage space of the Hypervisor of the second operating system, and loading the context of the Hypervisor of the first operating system, so that the currently running operating system is switched to the first operating system.

8. The electronic device according to claim 6, wherein the storing a context of the Hypervisor of the first operating system in a storage space of the Hypervisor of the first operating system, and loading a context of a Hypervisor of the second operating system is specifically as follows: calling back the KVM module in the Hypervisor of the first operating system, storing the context of the Hypervisor of the first operating system in the KVM module, and loading the context of the Hypervisor of the second operating system.

9. The electronic device according to claim 6, wherein the first operating system is a Host operating system, the Hypervisor of the first operating system is a platform Hypervisor, the second operating system is a Guest operating system, and the Hypervisor of the second operating system is a third-party Hypervisor, wherein the third-party Hypervisor is a Hypervisor other than the platform Hypervisor.

10. The electronic device according to claim 6, wherein a kernel of the first operating system is a Host Linux kernel, and a kernel of the second operating system is a Guest Linux kernel.

\* \* \* \* \*